United States Patent [19]

Engel et al.

[11] Patent Number: 5,691,869
[45] Date of Patent: Nov. 25, 1997

[54] LOW COST APPARATUS FOR DETECTING ARCING FAULTS AND CIRCUIT BREAKER INCORPORATING SAME

[75] Inventors: Joseph C. Engel, Monroeville; Raymond W. MacKenzie, Baldwin Boro, both of Pa.

[73] Assignee: Eaton Corporation, Cleveland, Ohio

[21] Appl. No.: 471,132

[22] Filed: Jun. 6, 1995

[51] Int. Cl.$^6$ ...................................................... H02H 3/00
[52] U.S. Cl. .................................................. 361/42; 361/94
[58] Field of Search .................................. 361/42, 46–50, 361/65, 76, 78, 79, 80, 94, 86–89, 93; 324/76, 41, 76.42, 76.43, 76.44, 76.45, 520–522, 541, 544; 364/481, 482, 483, 487

[56] References Cited

U.S. PATENT DOCUMENTS

| | | | |
|---|---|---|---|
| 3,515,943 | 6/1970 | Warrington | 317/27 |
| 3,654,519 | 4/1972 | South | 361/96 |
| 4,376,243 | 3/1983 | Renn et al. | 219/514 |
| 4,949,214 | 8/1990 | Spencer | 361/95 |
| 5,121,282 | 6/1992 | White | 361/42 |
| 5,223,795 | 6/1993 | Blades | 324/536 |
| 5,224,006 | 6/1993 | MacKenzie et al. | 361/45 |
| 5,307,230 | 4/1994 | MacKenzie | 361/96 |

FOREIGN PATENT DOCUMENTS

| | | | |
|---|---|---|---|
| 1210847 | 9/1986 | Canada | H02H 3/00 |
| 2116496 | 2/1994 | Canada . | |
| 0570206 A2 (A3) | 12/1993 | European Pat. Off. | H02H 1/00 |

OTHER PUBLICATIONS

"Arcing Ground Fault Detection System", Bulletin 1409, Allen-Bradley Co. catalog; undated, pp. 192–193 no date.

*Primary Examiner*—Jeffrey A. Gaffin
*Assistant Examiner*—Ronald W. Leja
*Attorney, Agent, or Firm*—Martin J. Moran

[57] ABSTRACT

A low cost analog arcing detector and a circuit breaker incorporating such a detector provide a variable response time to arcing faults based upon the amplitude of the arcing current. A filter generates pulses having an amplitude proportional to the amplitude of the step increase in current generated by the striking of the arc. The pulses are rectified and the amount by which the single polarity pulses exceed a threshold value, selected to eliminate nuisance trips on current step increases characteristic of some common loads, is integrated by a capacitor connected to a resistor which continually adjusts the capacitor voltage in a sense opposite to that of the pulses. The capacitor and resistor are selected to generate a trip signal as a function of the accumulated, time attenuated magnitude of the step increases in current associated with each striking of the arc current. Preferably, the pulses are squared before the reference current is subtracted to provide faster response for large amplitude arc currents, while avoiding false trips caused by known loads. Preferably, the arcing detector is used with a ground current detector which provides further protection by tripping on ground currents flowing through carbon tracks deposited by arcing currents below the threshold of the arcing fault detector.

11 Claims, 5 Drawing Sheets

LOW COST APPARATUS FOR DETECTING ARCING FAULTS AND CIRCUIT BREAKER INCORPORATING SAME

BACKGROUND OF THE INVENTION

1. Field of the Invention

This invention relates to apparatus responsive to arcing faults and circuit breakers incorporating same, and more particularly such apparatus preferably utilizing analog circuits.

2. Background Information

Conventional circuit breakers respond to overcurrents and short circuits to interrupt current in a protected circuit. Some circuit breakers also protect personnel and equipment from ground currents. Recently, there has been increased interest in providing protection against arcing faults. Arcing faults can occur for instance between adjacent bared conductors, between exposed ends of broken conductors, at a faulty connection and in other situations where conducting elements are in close proximity.

Arcing faults in ac systems can be intermittent as the magnetic repulsion forces generated by the arc current force the conductors apart to extinguish the arc. Mechanical forces then bring the conductors together again so that another arc is struck.

Arcing faults typically have high resistance so that the arcing current is below the instantaneous or magnetic trip thresholds of protection in a typical circuit breaker. Also, the intermittent nature of an arcing fault can create an average RMS current value which is below the thermal threshold for the circuit breaker. Even so, the arcs can cause injury or start a fire if they occur near combustible material. It is not practical to simply lower the pick-up currents on conventional circuit breakers as there are many typical loads which draw similar currents, and would therefore, cause nuisance trips.

Much attention has been directed toward trying to distinguish arcing currents from other intermittent currents. It has been recognized that arcing currents generate a step increase in current when the arc is struck. However, many typical loads generate a similar step increase when a device is turned on. In many instances, the step increases generated by these loads are singular events while an arcing fault generates a series of step increases. One fault detector counts the step increases and generates a trip signal if a selected number of step increases occur within a given interval. However, there are loads such as a solid state dimmer switch which also generates step increases in current when the firing angle is phased back substantially.

It has also been recognized that arcing faults generate a great deal of high frequency noise, and further, that there are periods of quiescence in the high frequency component. Some circuit breakers look to such features to differentiate arcing faults from other phenomena. Circuit breakers which rely upon such detailed characteristics of current waveforms to detect arcing faults typically utilize a microprocessor to perform the analysis. They also require fairly good quality analog-to-digital converters to capture the high frequencies of interest. Thus, such arcing fault detectors add significantly to the cost of a circuit breaker, and in the case of a typical residential circuit breaker, can multiply its cost many times. Yet even such sophisticated arc detecting circuit breakers are subject to nuisance trips when confronted with some common load devices.

There is a need therefore, for an improved circuit breaker for providing protection against arcing faults which is economically practical. In this regard, there is a need for such a circuit breaker which can reliably respond to arcing faults and which does not require a microprocessor and associated high quality analog to digital converters.

SUMMARY OF THE INVENTION

These needs and others are satisfied by the invention which is directed to apparatus for detecting an arcing fault and circuit breakers incorporating such apparatus both having a simple, low cost circuit to detect arcing faults. Rather than analyzing the high frequency noise which accompanies an arcing current, this circuit responds to a step increase in current accompanying each striking of the arc, and the repetitive occurrence of the arc. More particularly, it responds to the accumulated, time attenuated amplitude of the step increases in current. The greater the amplitude of the step increase in current caused by striking of the arc the fewer step increases are needed to detect the arcing current. In fact, if the arcing current is sufficiently high, a single striking of the arc will be sufficient to indicate the presence of the arc. In order to reduce nuisance tripping, a preferred embodiment of the invention only responds to step increases in current which exceed those associated with common loads, such as for instance dimmer switches and irons with a bi-metal thermostat.

In particular, an analog circuit in accordance with the invention includes sensing means which, in the preferred embodiment, is the bi-metal of the thermal trip unit commonly found in small circuit breakers. The voltage across the sensing means, which represents load current, is converted to pulses having an amplitude proportional to the amplitude of the step increase in load current by one or more low pass filters combined with one or more high pass filters. These pulses are full wave rectified and converted to current pulses by a circuit which responds to the very low amplitude pulse signals output by the filter. These current pulses are then applied to a capacitor which integrates them with respect to time. The charge on the capacitor is continuously adjusted so that the voltage across the capacitor represents the accumulated, time attenuated amplitude of the pulses. A current slightly greater than the magnitude of pulses which would be generated by common loads is subtracted from the current pulses before they are applied to the capacitor to reduce the chances of a nuisance trip. Also, a current can be subtracted from the capacitor to further reduce the possibility of nuisance tripping. A non-linear transfer function can be applied to the current pulses before or after the bias current is subtracted to provide better response to arcing faults while avoiding nuisance trips. Preferably, the non-linear function is a convex function, i.e., a function in which the slope is never negative. In a specific embodiment of the invention, the non-linear function is a squaring function. As another aspect of the invention, the arcing fault detector is preferably used together with a ground fault interrupter which we have found responds to high resistance line-to-ground faults such as can be caused by failures in wiring devices such as receptacles. Carbonization produced by the arcing provides a path to ground which results in tripping of the ground fault circuit at arcing currents below the threshold of the arcing fault detector which is necessarily set high enough to avoid nuisance trips.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a miniature circuit breaker such as that described in U.S. Pat. No. 4,081,852 which is hereby incorporated by reference. That circuit breaker incorporates a thermal-magnetic trip device comprising a bi-metal and a magnetic armature which unlatch a spring driven mechanism to open the contacts in response to a persistent overcurrent and a short circuit current, respectively. The circuit breaker of U.S. Pat. No. 4,081,852 includes a ground fault detector which can be replaced by, or be used in addition to, the arcing fault detector which forms a part of the present invention.

Figure 1:
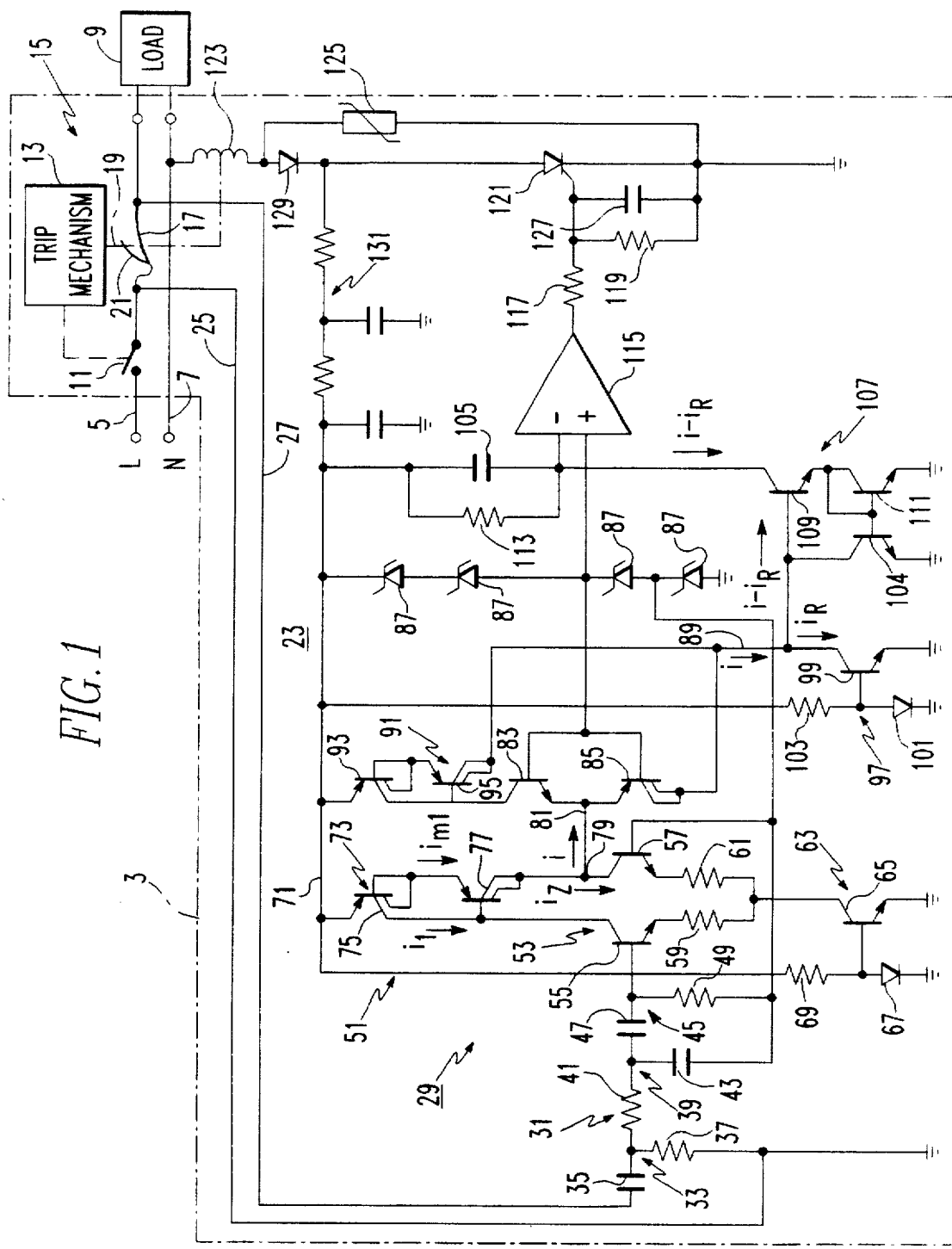
FIG. 1 is a schematic diagram of a circuit breaker in accordance with the invention.

Turning to FIG. 1, the electrical system 1 protected by the circuit breaker 3 includes a line conductor 5 and a neutral conductor 7 connected to provide power to a load 9. The circuit breaker 3 includes separable contacts 11 which can be tripped open by a spring operated trip mechanism 13. The trip mechanism 13 may be actuated by a conventional thermal-magnetic overcurrent device 15. This thermal-magnetic overcurrent device 15 includes a bi-metal 17 connected in series with the line conductor 5. Persistent overcurrents heat up the bi-metal 17 causing it to bend and release a latch 19 which actuates the trip mechanism 13. Short circuit currents through the bi-metal 17 magnetically attract an armature 21 which alternatively releases the latch 19 to actuate the trip mechanism 13.

In addition to the thermal-magnetic overcurrent device 15 which provides conventional protection, the circuit breaker 3 provides an arcing fault detector 23. This arcing fault detector 23 includes a pair of leads 25 and 27 connected to sense voltage across the bi-metal 17. As the resistance of the bi-metal 17 is known (for the exemplary bi-metal, about 0.0025 ohms), this voltage is a measure of the current flowing through the line conductor 5.

The arcing fault detector 23 is a trip circuit which responds to an inverse relationship between the magnitude of step increases in current produced by the striking of an arc in the electrical system 1, and the rate at which such arcs are struck. This arcing fault detector 23 includes a pulse generating circuit 29 which generates a pulse having a magnitude proportional to the magnitude of the step increase in current produced by the striking of the arc. This pulse generating circuit includes a filter 31 which in turn includes a first high pass filter 33 made up of a series capacitor 35 and a shunt resistor 37, a low pass filter 39 made up of the series resistor 41 and shunt capacitor 43 and a second high pass filter 45 made up of the series capacitor 47 and shunt resistor 49. The electrical system 1 commonly has a resistive plus inductive impedance which is variable. The time constants of the low pass filter 39 and the combined high pass filters 33 and 45 are selected to be below the electrical system response so that the amplitude of the filter output will be constant, regardless of the electrical system rise time. Further, the filter response must be chosen to provide sufficient attention at the power line frequency, e.g., 60 Hz. The response of the filter 31 to step increases in currents produced by an arcing fault is a pulse having a magnitude proportional to the magnitude of the step increase produced by striking of the arcing current. These pulses will have the polarity of the half cycle in which the arc is struck. For an arcing current which strikes each half cycle and is extinguished at zero crossings, the pulses will alternate in polarity.

The pulse generating circuit 29 also includes a rectifier circuit 51 for converting the bi-polar pulses output by the filter 31 into a single polarity pulse signal. A conventional diode bridge cannot be used to rectify the pulses because the diode voltage drops in the conventional rectifier exceed the millivolt signals produced by an arcing fault across the bi-metal 17. In addition, the rectifier circuit 51 converts the voltage pulses produced by the filter 31 into current pulses required by the trip signal generating circuit which follows.

The rectifier circuit 51 includes a differential amplifier 53 formed by the transistors 55 and 57. These transistors are connected through resistors 59 and 61 to a constant current source 63 formed by the transistor 65 supplied with a constant base bias provided by the diode 67 and a resistor 69 energized by the supply voltage bus 71. A current mirror 73 formed by the transistors 75 and 77 is connected between the supply voltage bus 71 and the collectors of the transistors 55 and 57. As is well known, the current mirror 73 operates to maintain the current $i_{m1}$ equal to the current $i_1$. With no output from the filter 31, the constant current provided by the constant current source 65 is evenly divided between $i_1$ and $i_2$. Since the current $i_{m1}$ is equal to the current $i_1$ it is also equal to the current $i_2$. Whenever the filter 31 generates a positive pulse in response to the striking of an arcing current during a positive half cycle of current on the line conductor 5, the transistor 55 is turned on more than the transistor 57 so that more of the constant current provided by the constant current source 65 flows through that transistor. Hence, the current $i_1$ exceeds the current $i_2$. Since the current mirror 73 causes the current $i_{m1}$ to equal the current $i_1$, $i_{m1}$ exceeds $i_2$ and a current $i$ flows out of the node 79 between the current mirror 73 and the transistor 57 on the lead 81.

The lead 81 is connected to the emitter of an npn transistor 83 and the emitter of the pnp transistor 85. The bases of the transistors 83 and 85 are biased by one-half the supply voltage by the ladder of zener diodes 87. With the current $i$ flowing out of the node 79, the transistor 85 is turned on to direct the current $i$ to the lead 89.

When the arcing current strikes on a negative half cycle of current on a line conductor 5, a negative pulse is output by the filter 31. Such negative pulses turn on the transistor 57 harder than the transistor 55 so that the current $i_2$ exceeds the current $i_1$. Therefore, the current $i_{m1}$ is smaller than the current $i_2$ and the current $i$ is reversed and flows into the node 79. This turns off the transistor 85 and turns on the transistor 83. The negative current $i$ flowing through the transistor 83 is mirrored by the mirror circuit 91 formed by the transistors 93 and 95 to produce the current $i$ on the lead 89. Thus, despite the polarity of pulses generated by the filter 31, pulses of a single polarity appear on the lead 89.

As mentioned, there are some loads which generate repetitive step increases in current which could be mistaken for arcing faults. Therefore, the present invention only responds to step increases in current which exceed those generated by common loads. This is accomplished by subtracting from the single polarity pulses appearing on the lead 89 a reference current $i_R$ produced by a constant current source 97 formed by the transistor 99 having constant bias applied to its base by a diode 101 and resistor 103 connected to the supply voltage bus 71. The portion by which the current pulses i exceed the threshold represented by the reference current $i_R$ flows to ground through transistor 104 and charges a capacitor 105 through a current mirror 107 formed by the transistors 109 and 111. When the amplitude of the pulses i do not exceed the reference voltage $i_R$ no current flows through the mirror 106, and hence the charge on the capacitor is not affected.

The voltage across the capacitor 105 is compared in a comparator 115 to a reference voltage set at about one-half the voltage on the supply bus 71 by the zener diodes 87. The capacitor 105 integrates with respect to time the amount by which the current pulses exceed the reference current $i_R$ while the resistor 113 adjusts the charge accumulated by continuously bleeding charge from the capacitor. The values of the capacitor 105 and the resistor 113 are selected to provide the desired accumulated, time attenuated pulse amplitude function. While the pulses produced by the striking of the arcing current can occur randomly, especially where the magnetic forces separate the conductors to extinguish the arc, the arc is struck repetitively thereby producing a series of pulses over time. Hence more pulses are required to reach the threshold voltage on the capacitor when the amplitude of the arcing current is low than would be required for larger arcing currents. In fact, a single pulse of sufficient amplitude will generate an output on the comparator 115. The output of the comparator 115 applies through the resistors 117 and 119 a turn-on voltage to the gate of an SCR 121. Turn-on of the SCR 121 energizes a trip coil 123 which releases the latch 19 on the trip mechanism 113 to open the contacts 11. The SCR is protected from voltage surges by the varistor 125 and its gate is protected from noise by a capacitor 127. Current for the detector circuit 23 is drawn from the neutral conductor 7 through the coil 1 and 23, and is halfwave rectified by the diode 129 and filtered by the filter 131 to produce the dc supply voltage on the supply voltage bus 71. The capacitor 105, resistor 113 and comparator 115 form a trip signal generator 116 which turns on the SCR 121.

Figure 2A:
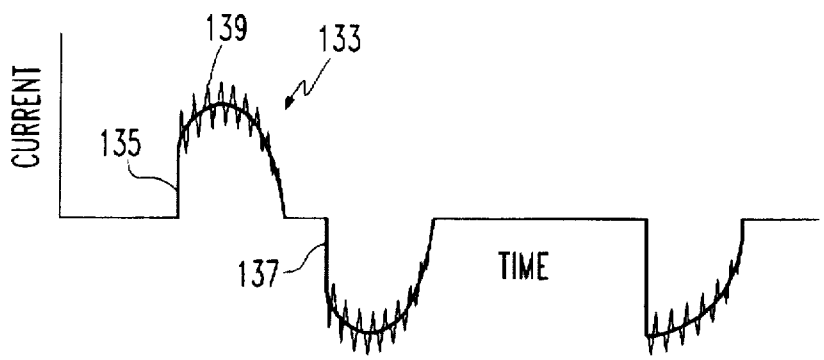
FIG. 2A illustrates a waveform associated with a typical arcing current to which the circuit breaker of FIG. 1 responds.

FIGS. 2A, 2B, 2C and 2D illustrate waveforms that are present at particular points in the circuit in FIG. 1. FIG. 2A illustrates a typical arcing current waveform 133. As can be seen, when the arc is struck a step increase in current is generated at 135. The arcing current is extinguished as it approaches 0. It remains 0 until the voltage on the negative half cycle reaches sufficient amplitude to strike the arc and a negative step increase in current 137 is generated. If the conductors are forced apart by the magnetic forces produced by the current, the arc would not be struck on the subsequent half cycle and it may be several cycles before the conductors again come close enough for the arcing current to strike again. This can occur randomly so that the polarity of the step increases in current can be random. It will be noticed that there is some high frequency noise 139 on the arcing waveform. It is this high frequency component which many arcing fault detectors look for. The detector circuit of the present invention only responds to the step increases in current.

Figure 2B:
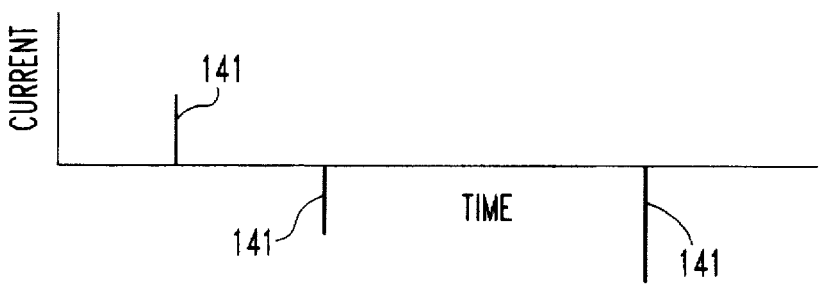
FIG. 2B is a waveform diagram illustrating a pulse signal generated by the circuit breaker of FIG. 1 in response to the arcing current shown in FIG. 2A.
Figure 2C:
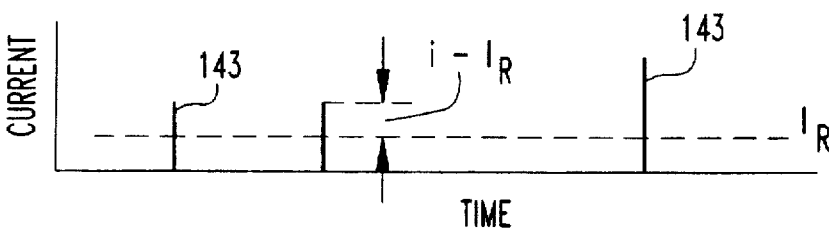
FIG. 2C is a waveform diagram showing the pulses of FIG. 2B after they have been further processed by the circuit breaker of FIG. 1.
Figure 2D:
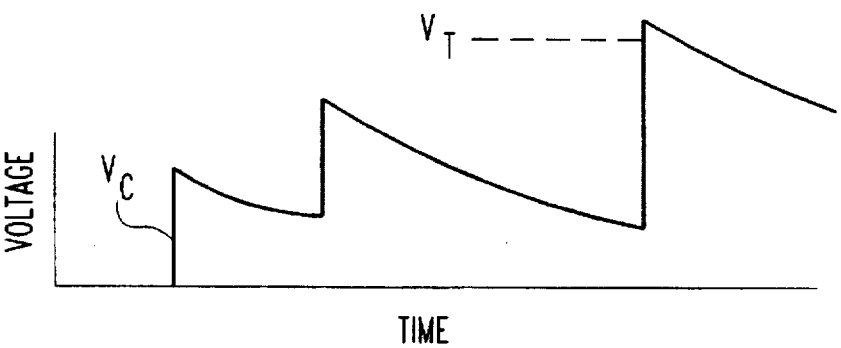
FIG. 2D is a waveform diagram illustrating the voltage produced on a capacitor forming part of the circuit of FIG. 1 by the pulses of FIG. 2C.

FIG. 2B illustrates the pulse waveform which is output by the filter 31. As indicated, these pulses 141 can be of either polarity. FIG. 2C illustrates the single polarity pulses 143 which appear on the lead 89 at the output of the rectifier circuit 51. FIG. 2C also illustrates that only the portions of the pulses 143 that exceed the reference current $i_R$ are applied to the integrating capacitor 105. FIG. 2D illustrates the voltage $V_c$ on the capacitor 105. As can be seen, each pulse adds charge to the capacitor which increases its voltage. Between pulses, the voltage decays as the charge is bled by resistor 113. If the pulses are of large enough amplitude and occur frequently enough, the voltage on the capacitor 105 reaches the trip voltage $V_t$ represented by the reference voltage applied to comparator 115, and the SCR 121 is fired to trip the circuit breaker.

Figure 3A:
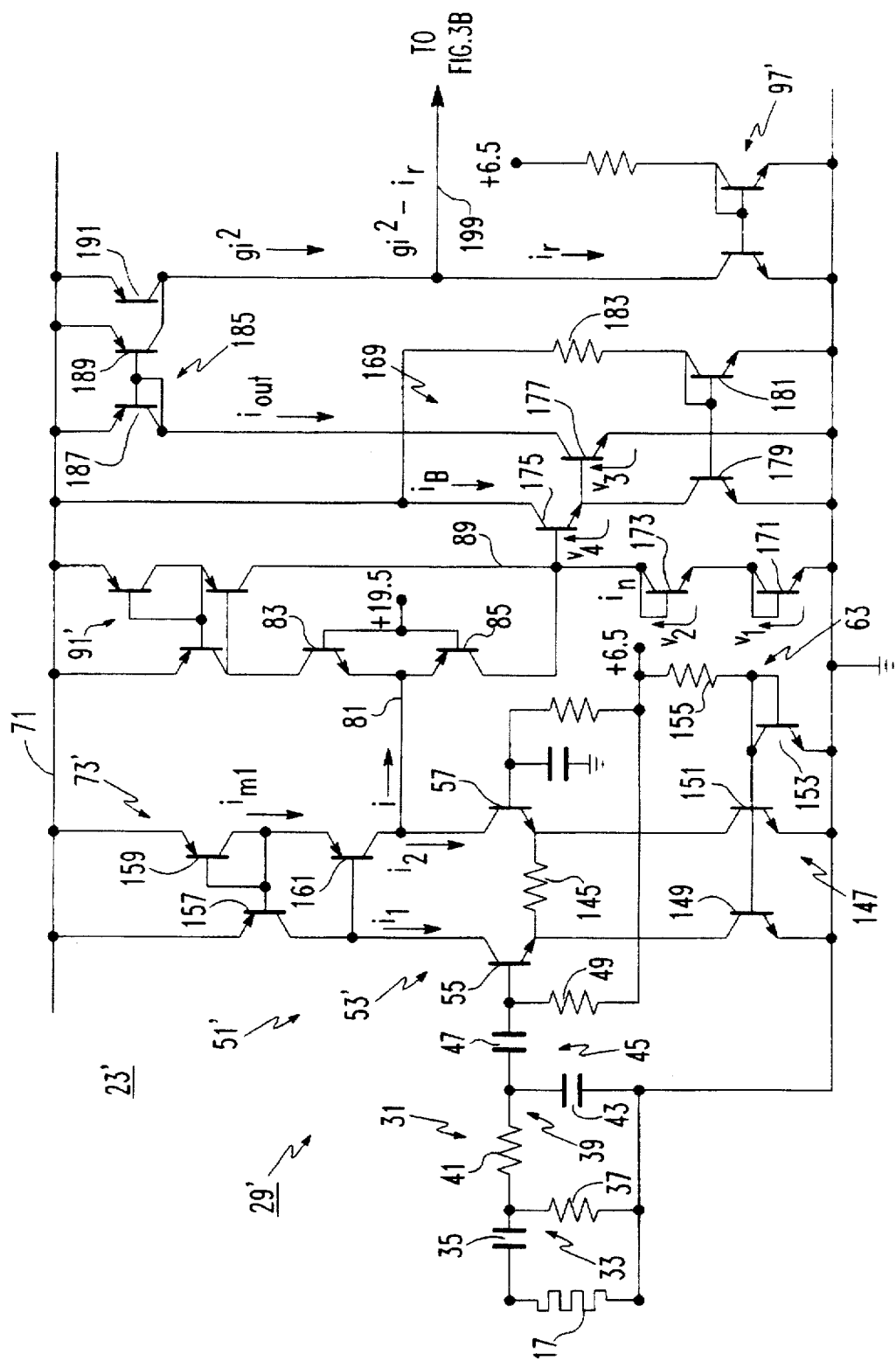
FIG. 3A and 3B together illustrate a schematic circuit diagram of another embodiment of a circuit breaker in accordance with the invention.
Figure 3B:
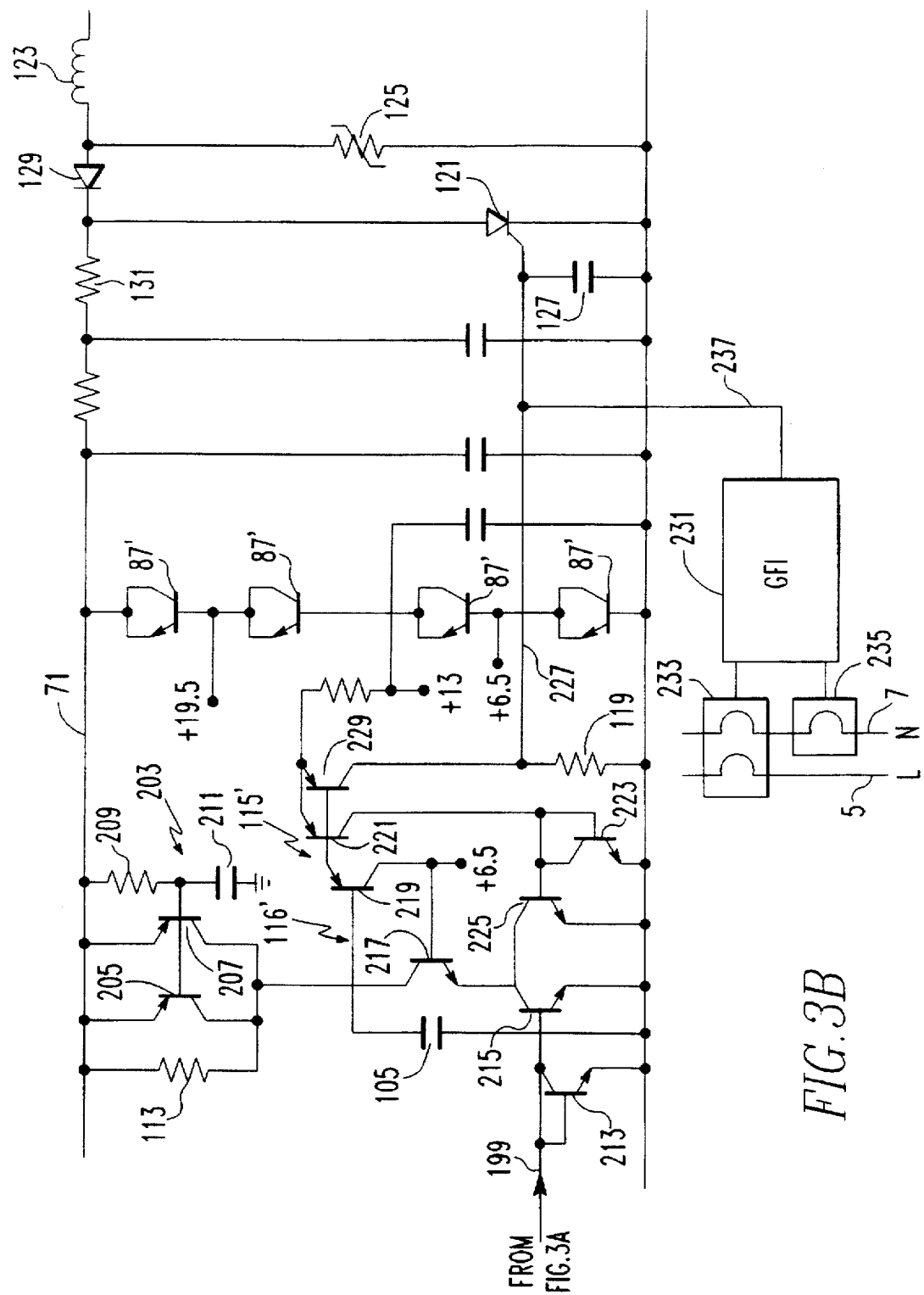

FIGS. 3A and 3B illustrate another embodiment of the invention wherein like components are identified by like reference characters and wherein components similar to those in the circuit of FIG. 1 are identified by the same reference character primed. The major difference between the circuit of FIGS. 3A and 3B and the circuit of FIG. 1 is that the second embodiment of the invention squares the current pulses before the reference current is subtracted. The arcing fault detector 23' of FIGS. 3a and 3b like that of FIG. 1 utilizes the voltage generated across the bimetal 17 as a measure of current flowing in the line conductor. The pulse generating circuit 29' includes the filter 31 comprising a high-pass filter 33, a low-pass filter 39, and a second high-pass filter 45, having time constants selected as discussed in connection with FIG. 1 so that the response of the filter 31 to step increases in currents produced by an arcing fault is a pulse having a magnitude proportional to the magnitude of the step increase produced by striking of the arcing current. Again, these pulses have the polarity of the half cycle in which the arc is struck.

The pulse generating circuit 29' also includes the rectifier circuit 51' for converting the bi-polar pulses output by the filter 31 into a single polarity pulse signal. The rectifier circuit 51' includes the differential amplifier 53' formed by the transistors 55 and 57, the emitters of which are connected by a resistor 145. These emitters are also connected to a constant current source 147 formed by the transistors 149 and 151, having a common base drive provided by a transistor 153 energized through resistor 155.

The rectifier circuit 51' also includes the current mirror 73' comprising the transistors 157, 159, and 161. As discussed in connection with FIG. 1, the current mirror 73' assures that the current $i_{m1}$ remains equal to the current $i_1$. When the onset of an arc causes the filter circuit 31 to apply a positive pulse to the differential amplifier 53', the transistor 55 is turned on harder than the transistor 57. This results in current flowing through the resistor 145 which reduces the current $i_2$. Thus, a current i flows out of the node 79. This current pulse, being positive, turns on the transistor 85 to produce a pulse on the lead 89.

When the filter 31 applies a negative pulse to the differential amplifier 53', the polarity of the current i at node 79 reverses and a transistor 83 is turned on. The current mirror 91' formed by the transistors 163, 165, and 167 produces a pulse of positive polarity on the lead 89.

A circuit 169 applies a selected transfer function to the unipolar pulses generated on the lead 89. Preferably, the transfer function is a convex function, that is, the slope of the function is never negative. In the exemplary embodiment of the invention, the circuit 169 is a squaring circuit which squares the pulses on the lead 89.

This circuit 169 includes a pair of transistors 171 and 173 connected between the lead 89 and ground. The lead 89 is also connected to the base of a transistor 175 which has its emitter connected to the base of a grounded emitter transistor 177. The pulses on the lead 89 pass through the transistors 171 and 173 producing voltage drops $V_1$ and $V_2$, respectively. The sum of the emitter-to-base voltages $V_3$ and $V_4$ of the transistors 177 and 175 equals the sum of the voltages $V_1$ and $V_2$. A constant current source formed by a transistor 179 having its base drive fixed by the transistor 181 which is connected to the power supply bus 71 through the resistor 183 draws a constant current through the transistor 175. As the transistor 175 has a high gain, and therefore draws negligible current through its base, the voltage $V_4$ is fixed by the bias current $i_b$ drawn by the constant current source. As is known, the voltages $V_1$ to $V_4$ are a function of the log of the current through the respective transistors. Thus, the following relationship applies:

$$\log i_1 + \log i_2 = \log i_3 + \log i_4$$

and, therefore:

$$i_1 \times i_2 = i_3 \times i_b$$

since $i_1$ and $i_2$ are both equal to $i_{in}$ (the current pulses on lead 89):

$$i_{in}^2 = i_3 \times i_b$$

and, $$i_3 = \frac{i_{in}^2}{i_b} = i_{out}$$

The squared pulses are amplified by a current mirror 185 having an input transistor 187 and a pair of output transistors 189 and 191 so that a gain of two is applied to the squared pulses.

In order to preclude nuisance trips caused by common loads, a reference current $i_r$ is subtracted from the amplified squared pulse signal by a constant current source 97' which comprises a transistor 193 having constant base drive current provided by the transistor 195 energized through the resistor 197. The resultant pulses which exceed the threshold current $i_R$ are provided on the lead 199.

Turning to FIG. 3B, these clipped pulses on the lead 199 are applied to the trip signal generator 116'. The trip signal generator 116' includes an integrating capacitor 105. The capacitor 105 is charged from the power supply lead 71 through a resistor 113'. When the circuit is first turned on, a rapid charging circuit 203 initially brings the capacitor 105 up to full charge. This rapid charging circuit 203 includes a pair of transistors 205 and 207 connected in parallel between the power supply lead 71 and the capacitor 105. Base drive to turn on these transistors is provided through a capacitor 211. The resistor 209, by diverting some of the charging current, establishes a minimum level of dv/dt required to turn on the transistors 207 and 209. When the capacitor 211 becomes fully charged, the transistors 207 and 209 are turned off, and subsequent charging of the capacitor 105 is through the resistor 113'.

The capacitor 105 of the trip signal generating circuit 116' integrates the clipped pulses provided on the lead 199. Each pulse turns on a transistor 213 to turn on a transistor 215 which, in turn, turns on a transistor 217 which drains charge from the capacitor 105 in proportion to the magnitude and duration of the pulse. Successive pulses reduce the voltage on the capacitor 105; however, the resistor 113' continuously applies charging current to the capacitor 105. The parameters are selected such that the selected function of the accumulated, time attenuated amount by which the magnitude of the squared pulses exceeds the reference current is implemented. When the voltage on the capacitor 105 reaches the reference voltage on the comparator 115' formed by the transistors 219 and 221, which is the supply voltage (+13 volts) minus the diode drops of these two transistors, the transistors 219 and 221 are turned on. This turns on a pair of transistors 223 and 225 which latch the transistor 215 full-on to generate a positive trip signal on the lead 227 through transistor 229. This trip signal turns on the SCR 121 to energize the trip coil 123.

Preferably, the sputtering arc fault detector 23' is used together with a ground current detection circuit such as the ground fault circuit 231 or an earth leakage protection circuit (not shown), which are used for people protection and equipment protection, respectively. Preferably, the ground fault interrupting circuit 231 is of the dormant oscillator type such as is shown in U.S. Pat. No. 5,224,006 which is hereby incorporated by reference. Such a dormant oscillator type ground fault interrupting circuit includes two pick-up coils. The first coil 233 is a toroidal coil through which both the line and neutral conductors 5 and 7 pass. Only the neutral conductor 7 passes through the second toroidal coil 235.

The ground current detection circuit such as ground fault circuit 231 is particularly useful in combination with the arcing fault detector. As mentioned, the arcing fault detector 23' is subject to nuisance trips caused by some common loads which produce waveforms similar to those caused by arcing faults. Thus, the magnitude of the step increases in current to which the arcing fault detector responds must be set high enough to avoid response to common loads which can produce a similar step increase. We have found that arcing conditions such as can be created in wiring devices such as receptacles by faulty connections cause carbonization which can lead to tripping of the ground fault interrupter at arcing currents which are below the response level of the arcing fault detector. Thus, the ground fault interrupter 231 extends protection against arcing faults. The trip signal generated by the ground fault interrupting circuit 231 turns on the SCR 121 through the lead 237 to energize the trip solenoid 123.

The ground fault detector 231 and the arcing fault detector 23' can be implemented on a single integrated circuit chip (not shown). Certain of the components of the arcing fault detector 23' could be implemented by discrete components off of the chip to provide for easy modification of the circuit for different applications. For instance, the input filter 31 could be provided by discrete components in order to adjust the sensitivity of the arcing fault detector. In addition, the capacitor 105 and charging resistor 201 could be discrete elements selected to provide the desired inverse relationship between the amplitude of the pulses and the arcing rate. In connection with this, the resistor 209 and capacitor 211 which form part of the circuit 203 for initially charging the capacitor 105 could also be selectable off chip components. It may also be desirable to make the resistor of the threshold circuit 97' a discrete resistor to adjust the threshold level.

Figure 4:
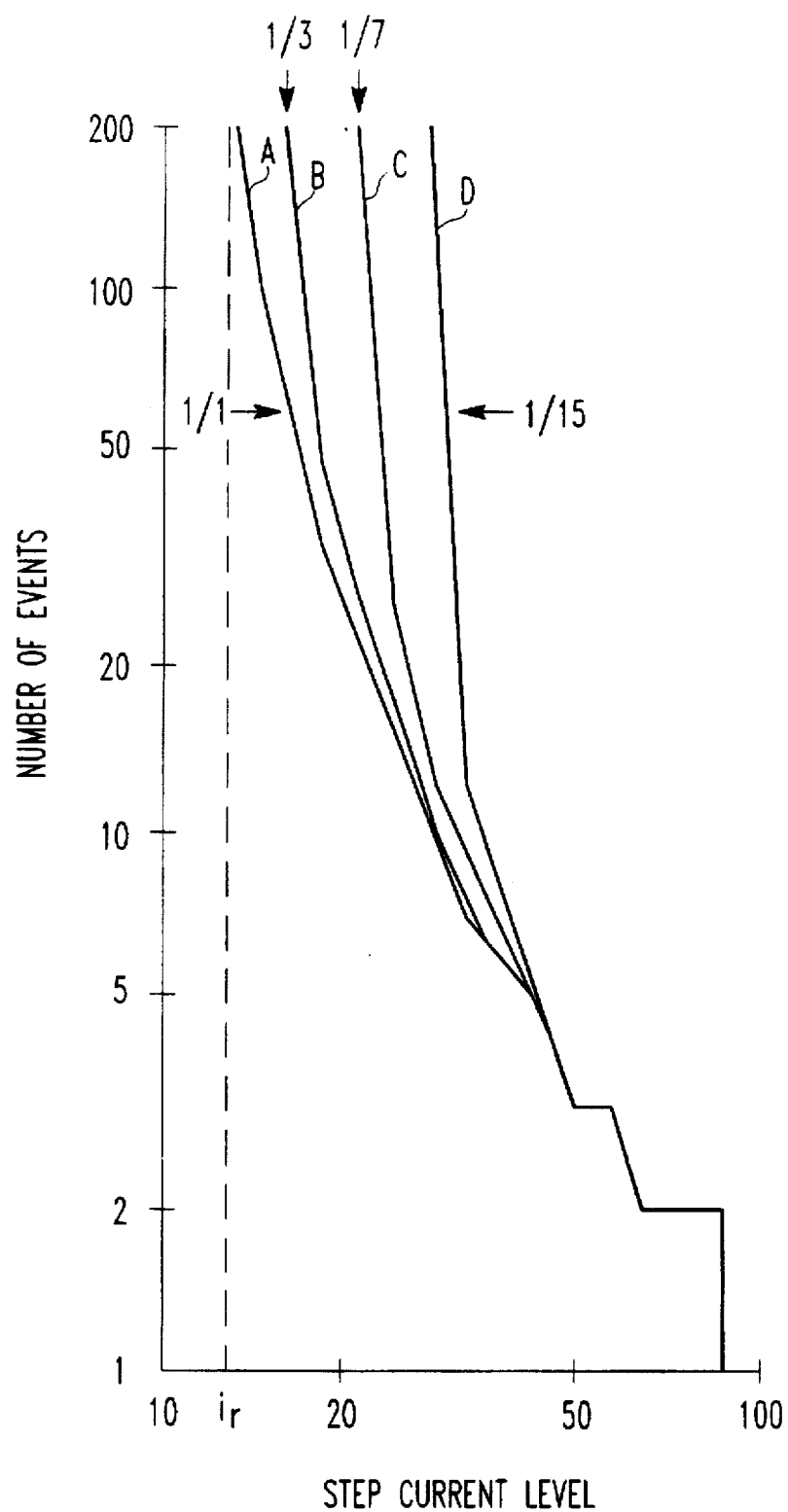
FIG. 4 is a plot illustrating the response of the circuit breaker shown in FIGS. 3A and 3B.

FIG. 4 illustrates the inverse relationship between the amplitude of the pulses generated by the onset of the arcing current and the number of pulses required to generate a trip signal. As can be seen from FIG. 4 the amplitude of the pulses must exceed the threshold value represented by $i_R$ in order to generate a trip signal. On the other hand a single step increase in current of about 90 amps in the example will trip the circuit breaker.

Four traces A–D representing several ratios of half cycles in which an arc is struck to the total number of half cycles are shown in FIG. 4. For instance, trace A illustrates the response curve wherein an arc is initiated during each half cycle and thus is extinguished at each zero crossing. The trace B represents the instance wherein an arc is initiated once every three half cycles, while trace C illustrates a duty cycle of an arc struck every seven half cycles and trace D represents the response for a duty cycle in which an arc is struck only every 15 half cycles.

As can be appreciated, the invention provides a simple, low cost detector for distinguishing arcing faults from normally encountered loads which also distort the current waveform in electrical distribution systems. This simple circuit provides variable response dependent upon the amplitude of the step increases in current produced by the striking of the arcing current and the time intervals at which repetitive pulses occur.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A circuit breaker for interrupting current in an electrical system subject to an arcing current of undetermined amplitude which repetitively strikes, said breaker comprising;

separable contacts which interrupt said current in said electrical system including said arcing current when open;

trip means comprising pulse generating means generating a pulse with an amplitude which is a direct function of said undetermined amplitude of said arcing current each time said arcing current strikes to produce a series of pulses, trip signal generating means generating a trip signal as a function of an accumulated, time attenuated amplitude of said pulses, and means opening said separable contacts in response to said trip signal;

wherein said pulse generating means generates current pulses of a single polarity, and said trip signal generating means comprises a capacitor, means applying said pulses to said capacitor, adjusting means connected to said capacitor for adjusting a charge on said capacitor at a selected rate in an opposite sense from said pulses, and output means generating said trip signal when voltage across said capacitor reaches a predetermined value, said capacitor and adjusting means being selected such that said voltage across said capacitor is determined by said accumulated time attenuated amplitude of said pulses; and wherein said pulse generating means includes means applying a convex function to said pulses to produce non-linear pulses which are applied to said capacitor by said trip signal generating means.

2. The circuit breaker of claim 1 wherein said means applying said pulses to said capacitor comprises means only applying a portion of said non-linear pulses exceeding a threshold value to said capacitor.

3. A circuit breaker for interrupting current in an electrical system subject to an arcing current of undetermined amplitude which repetitively strikes and subject to intermittent normal load currents of a certain amplitude, said circuit breaker comprising:

separable contacts which interrupt said current in said electrical system including said arcing current when open;

trip means comprising pulse generating means generating a pulse with an amplitude which is a direct function of said undetermined amplitude of said arcing current each time said arcing current strikes to produce a series of pulses, trip signal generating means generating a trip signal as a function of an accumulated, time attenuated amplitude of said pulses, and means opening said separable contacts in response to said trip signal;

wherein said pulse generating means generates current pulses of a single polarity, and said trip signal generating means comprises a capacitor, means applying said pulses to said capacitor, adjusting means connected to said capacitor for adjusting charge on said capacitor at a selected rate in an opposite sense from said pulses, and output means generating said trip signal when voltage across said capacitor reaches a predetermined value, said capacitor and adjusting means being selected such that said voltage across said capacitor is determined by said accumulated amplitude of said pulses;

wherein said means applying said current pulses to said capacitor comprises means only applying a portion of said pulses exceeding a threshold value to said capacitor; and wherein said means applying a portion of said pulses exceeding a threshold value to said capacitor comprises means subtracting from said pulses a reference current which is said direct function of a current in said electrical system greater than said certain amplitude of said intermittent normal currents.

4. The circuit breaker of claim 3 wherein said trip signal generating means further includes ground detecting means which generates said trip signal in response to a ground current above a predetermined level but below said certain amplitude of said intermittent normal currents.

5. A circuit breaker for interrupting current in an electrical system subject to an arcing current of undetermined amplitude which repetitively strikes said circuit breaker, comprising:

separable contacts which interrupt said current in said electrical system including said arcing current when open;

trip means comprising pulse generating means generating a pulse with an amplitude which is a direct function of said undetermined amplitude of said arcing current each time said arcing current strikes to produce a series of pulses, trip signal generating means generating a trip signal as a function of an accumulated, time attenuated amplitude of said pulses, and means opening said separable contacts in response to said trip signal; and wherein said pulse generating means includes means applying a convex function to said pulses to produce a series of non-linear pulses and wherein said trip signal generating means generates said trip signal as a function of an accumulated, time attenuated amplitude of said non-linear pulses.

6. The circuit breaker of claim 5 wherein said pulse generating means includes means subtracting from said non-linear pulses a reference current which is a direct function of current in said electrical system and which would generate a nuisance trip.

7. Apparatus for detecting arcing current of undetermined amplitude which strikes repetitively in an electrical system, said apparatus comprising:

pulse generating means generating a pulse with an amplitude proportional to the undetermined amplitude of said arcing current each time said arcing current strikes to produce a series of pulses;

output signal generating means generating an arcing signal as a function of an accumulated, time attenuated amplitude of said pulses; and wherein said pulse generating means includes means applying a convex function to said pulses to produce a series of non-linear pulses and wherein said output signal generating means generates said arcing signal as a function of an accumulated, time attended amplitude of said non-linear pulses.

8. The apparatus of claim 7 wherein said pulse generating means includes means subtracting from said non-linear pulses a reference current which is a direct function of current in said electrical system and which would generate a nuisance trip.

9. Apparatus for detecting arcing current of undetermined amplitude which strikes repetitively in an electrical system, said apparatus comprising:

pulse generating means generating a pulse with an amplitude proportional to the undetermined amplitude of said arcing current each time said arcing current strikes to produce series of pulses;

output signal generating means generating an arcing signal as a function of an accumulated, time attenuated amplitude of said pulses;

wherein said output signal generating means generates said arcing signal as a function of an accumulated, time attenuated amount by which said amplitude of said pulses exceeds a threshold value;

wherein said pulse generating means generates current pulses of a single polarity, and said output signal generating means comprises a capacitor, means applying said pulses to said capacitor, adjusting means connected to said capacitor for adjusting charge on said capacitor in an opposite sense from said pulses at a selected rate, and said output signal means generating said arcing signal when said voltage across said capacitor reaches a predetermined value, said capacitor and adjusting means being selected such that said voltage across said capacitor is determined by accumulated, time attenuated amplitude of said pulses;

wherein said pulse generating means includes means applying a convex function to said pulses to produce non-linear pulses which are applied to said capacitor; and wherein said means applying a convex function to said pulses comprises means squaring said pulses to produce squared pulses which are applied to said capacitor.

10. Apparatus for detecting arcing current of undetermined amplitude which strikes repetitively in an electrical system, said apparatus comprising;

pulse generating means generating a pulse with an amplitude proportional to the undetermined amplitude of said arcing current each time of said arcing current strikes to produce series of pulses;

output signal generating means generating an arcing signal as a function of an accumulated, time attenuated amplitude of said pulses;

wherein said output signal generating means generates said arcing signal as a function of an accumulated, time attenuated amount by which said amplitude of said pulses exceeds a threshold value;

wherein said pulse generating means generates current pulses of a single polarity, and said output signal generating means comprises a capacitor, means applying said pulses to said capacitor, adjusting means connected to said capacitor for adjusting charge on said capacitor in an opposite sense from said pulses at a selected rate, and said output signal generating means generating said arcing signal when said voltage across said capacitor reaches a predetermined value, said capacitor and adjusting means being selected such that said voltage across said capacitor is determined by accumulated, time attenuated amplitude of said pulses;

wherein said pulse generating means includes means applying a convex function to said pulses to produce non-linear pulses which are applied to said capacitor; and wherein said means applying said pulses to said capacitor comprises means only applying a portion of said non-liner pulses exceeding a threshold value to said capacitor.

11. A circuit breaker for interrupting current in an electrical system subject to an arcing current of undetermined amplitude which repetitively strikes, said circuit breaker comprising;

separable contacts which interrupt said current in said electrical system including said arcing current when open;

trip means comprising pulse generating means generating a pulse with an amplitude which is in direct function of said undetermined amplitude of said arcing current each time said arcing current strikes to produce a series of pulses, trip signal generating means generating a trip signal as a function of an accumulated, time attenuated amplitude of said pulses, and means opening said separable contacts in response to said trip signal; and wherein said pulse generating means includes means applying a convex function to said pulses to produce a series of pulses and wherein said trip signal generating means generates said trip signal as a function of an accumulated, time attenuated amplitude of said pulses.

* * * * *